United States Patent
Yu

(10) Patent No.: US 9,829,177 B2
(45) Date of Patent: Nov. 28, 2017

(54) OPTICAL LENS

(71) Applicant: GRANDLITE INTERNATIONAL CORP, City of Industry, CA (US)

(72) Inventor: Chung-Han Yu, City of Industry, CA (US)

(73) Assignee: GRANDLITE INTERNATIONAL CORP, City of Industry, CA (US)

( * ) Notice: Subject to any disclaimer, the term of this patent is extended or adjusted under 35 U.S.C. 154(b) by 183 days.

(21) Appl. No.: 14/842,968

(22) Filed: Sep. 2, 2015

(65) Prior Publication Data

US 2017/0059123 A1 Mar. 2, 2017

(51) Int. Cl.
*F21V 5/04* (2006.01)
*G02B 3/00* (2006.01)
*F21Y 115/10* (2016.01)

(52) U.S. Cl.
CPC ............... *F21V 5/048* (2013.01); *G02B 3/00* (2013.01); *F21Y 2115/10* (2016.08)

(58) Field of Classification Search
CPC ......... F21V 5/048; G02B 3/00; F21Y 2115/10
See application file for complete search history.

(56) References Cited

U.S. PATENT DOCUMENTS 5,982,565 A * 11/1999 Nomura ............. B29C 45/0025
264/2.2

FOREIGN PATENT DOCUMENTS

BE WO 2004005977 A1 * 1/2004 ............... G02B 3/00

* cited by examiner

*Primary Examiner* — David V Bruce
(74) *Attorney, Agent, or Firm* — Amin, Turocy & Watson LLP

(57) ABSTRACT

An optical lens has a beam angle within 29-46 degrees, and includes: an output light region including a first output light surface, a second output light surface around the first output light surface, a buffer surface connecting the first and second output light surfaces, and an outer surface around the second output light surface; an incident light region including a planer incident light surface and an inner surface, the planer incident light surface opposing the first and second output light surfaces, the inner surface around the planer incident light surface and opposing the outer surface, the planer incident light surface and the inner surface connected to each other and forming a slot denting toward the first output light surface; and a mounting portion around and extending outside with respect to the output light region and the incident light region.

8 Claims, 10 Drawing Sheets

OPTICAL LENS

BACKGROUND OF THE INVENTION

1. Field of the Invention

This invention relates to optical lenses, and, more particularly, to an optical lens that is used for an LED.

2. Description of Related Art

A light emitting diode (LED) is a semiconductor component that converts a current to a certain wavelength range. An LED, due to its various advantages, such as high light intensity, low working voltage and power consumption, easy compatibility with an integrated circuit, simple driving mechanism, and long lifespan, is widely applied to an illumination field.

In recent years, illumination equipment that employs LEDs is replacing the conventional outdoor illumination equipment such as street light. However, LEDs emit light in a certain direction. Compared with the convention illumination equipment, which emits non-directional light, LEDs have significantly different light distribution. Therefore, LEDs are used as outdoor illumination equipment in a limited manner.

In order for an LED to be used effectively, a lens covers a packaged LED and calibrates the light emitted from the packaged LED.

How to provide a lens that outputs symmetrical light and has a certain beam angle is one of the most popular development issues in the art.

SUMMARY OF THE INVENTION

In an embodiment, the present invention provides an optical lens that is used for covering a light emitting unit, the optical lens comprising: an output light region that includes a first output light surface at a center of the output light region and having a first curvature, a second output light surface around the first output light surface and having a second curvature greater than the first curvature, a buffer surface connecting the first output light surface and the second output light surface, and an outer surface connecting to and around the second output light surface; an incident light region that includes a planer incident light surface opposing the first output light surface and the second output light surface, and an inner surface around the planer incident light surface and opposing the outer surface, the planer incident light surface and the inner surface connected to each other and forming a slot denting toward the first output light surface, wherein the slot is configured to receive the light emitting unit; and a mounting portion around the outer light region and the incident light region, the mounting portion connecting to the output light region and the incident light region and extending outside with respect to the output light region and the incident light region.

In an embodiment, the optical lens has a beam angle within 29-46 degrees, and a focal length of 16.86 mm±2%.

In another embodiment, the present invention provides an optical lens that is used for covering a light emitting unit, the optical lens comprising: an output light region that includes an output light surface and an outer surface, the outer surface connecting to and around the output light surface; an incident light region that includes a planer incident light surface and an inner surface, the planer incident light surface opposing the output light surface, the inner surface around the planer incident light surface and opposing the outer surface, the planer incident light surface and the inner surface connected to each other and forming a slot denting toward the output light surface, wherein the slot is configured to receive the light emitting unit; and a mounting portion around the outer light region and the incident light region, the mounting portion around the outer light region and the incident light region and extending outside with respect to the output light region and the incident light region.

In yet another embodiment, the optical lens has a beam angle within 70-100 degrees, and a focal length of 16 mm±2%.

BRIEF DESCRIPTION OF DRAWINGS

The invention can be more fully understood by reading the following detailed description of the preferred embodiments, with reference made to the accompanying drawings, wherein.

DETAILED DESCRIPTION OF THE INVENTION

Figure 1:
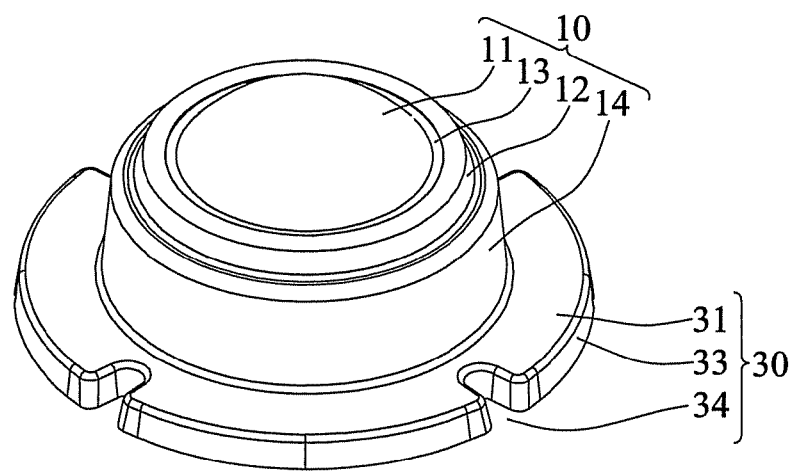
FIG. 1 is a perspective view of an optical lens of a first embodiment according to the present invention.
Figure 2:
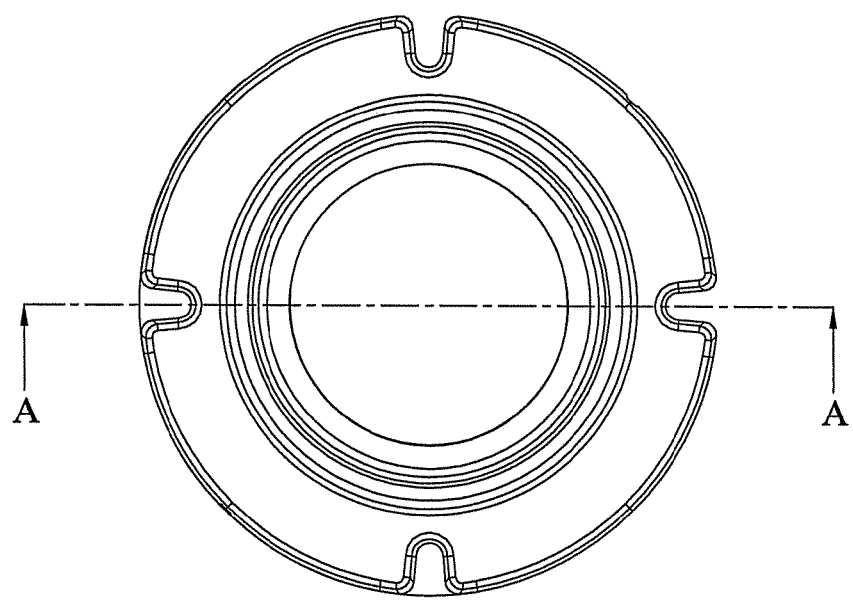
FIG. 2 is a top view of the optical lens of the first embodiment according to the present invention.

The following illustrative embodiments are provided to illustrate the disclosure of the present invention, these and other advantages and effects can be apparently understood by those in the art after reading the disclosure of this specification. The present invention can also be performed or applied by other different embodiments. The details of the specification may be on the basis of different points and applications, and numerous modifications and variations can be devised without departing from the spirit of the present invention.

First Embodiment

Referring FIGS. 1-4, a perspective view, a top view, a cross-sectional view and a bottom view of an optical lens of a first embodiment according to the present invention are shown, respectively. The optical lens comprises an output light region 10, an incident light region 20 and mounting portion 30.

The output light region 10 includes a first output light surface 11 disposed in a center of the output light region 10 and having a first curvature R1, a second output light surface 12 around the first output light surface 11 and having a second curvature R2, a buffer surface 13 connecting the first output light surface 11 and the second output light surface 12 and having a third curvature R3 and a fourth curvature R4, and an outer surface 14 connected to and around the second output light surface 12 and having a fifth curvature R5 and a sixth curvature R6.

The first curvature R1 is less than the second curvature R2. In an embodiment, the first curvature R1 is 24.8 mm±2%, and the second curvature R2 is 64.2 mm±2%. The buffer surface 13 has a dented portion adjacent to the first output light surface 11 and a protruding portion adjacent to the second output light surface 12, the dented portion has the third curvature R3 equal to about 1 mm±2%, and the protruding portion has the fourth curvature R4 equal to about 2 mm±2%. The outer surface 14 has a dented portion adjacent to the second output light surface 12 and a protruding portion adjacent to the mounting portion 30, the dented portion has the fifth curvature R5 equal to about 1 mm±2%, and the protruding portion has the sixth curvature R6 equal to about 2 mm±2%.

The incident light region 20 has a planer incident light surface 21 opposing the first output light surface 11 and the second output light surface 12, and an inner surface 22 opposing the outer surface 14 and around the incident light surface 21. The incident light surface 21 and the inner surface 22 are connected to each other to constitute a slot 23 that is dented toward the output light surface 11 for receiving a light emitting unit (not shown) such as an LED.

The incident light surface 21, the first output light surface 11 and the second output light surface 12 constitute a plane-convex lens that has a focal length of 16.86 mm±2%. The incident light surface 21 is spaced from the first output light surface 11 at a distance (i.e., the thickness of the plane-convex lens) t1 of 19.8 mm±2%. The slot 23 has a depth h1 greater than the focal length, and is 18.1 mm±2%, for the light emitting unit to be disposed at a focal point of the plane-convex lens. The slot 23 has a diameter that becomes smaller from an opening portion to the incident light surface 21, for example decreasing from 56.2 mm to 53.4 mm, for an LED having a size within 10.5-25 mm to be received therein.

The mounting portion 30 is around the output light region 10 and the incident light region 20, and connected to the outer surface 14 and the inner surface 22, extends outside with respect to the incident light region 20 and the output light region 10, and includes a plurality of mounting holes 34 and a plurality of wire slots 35. The mounting portion 30 comprises opposing first surface 31 and second surface 32, and a lateral surface 33 connected to the first surface 31 and the second surface 32. The mounting holes 34 are formed on the lateral surface 33, for a screw to fix the optical lens to a fixture such as a lamp. The wire slots 35 are formed on the second surface 32, for a wire of a light emitting unit such as an LED to be received therein and protrudes therefrom.

Figure 3:
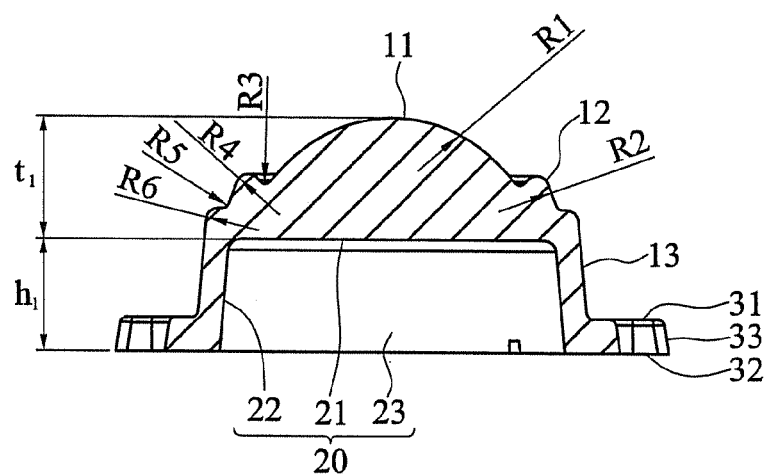
FIG. 3 is a cross-sectional view of optical lens of the first embodiment along a line A-A of FIG. 2 according to the present invention.
Figure 4:
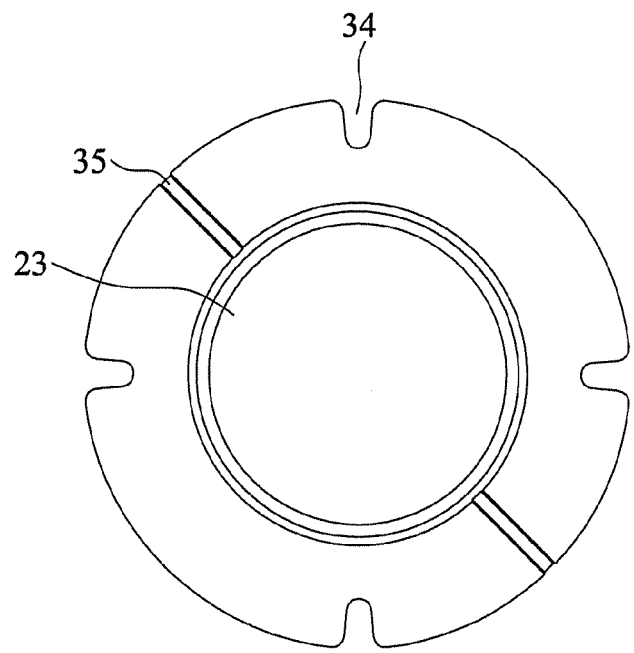
FIG. 4 is a bottom view of the optical lens of the first embodiment according to the present invention.

The cross-sectional view of FIG. 3 shows that the mounting portion 30 is greater than the plane-convex lens constituted by the first output light surface 11, the second output light surface 12 and the incident light surface 21. The bottom view of FIG. 4 shows that the optical lens according to the present invention is axially symmetrical, substantially circular, and a line connecting corresponding two of the four mounting holes 34 passes through a center, in order to ensure that the optical lens is securely fixed to another fixture. A line connecting the other two wire slots 35 also passes through the center.

Figure 5:
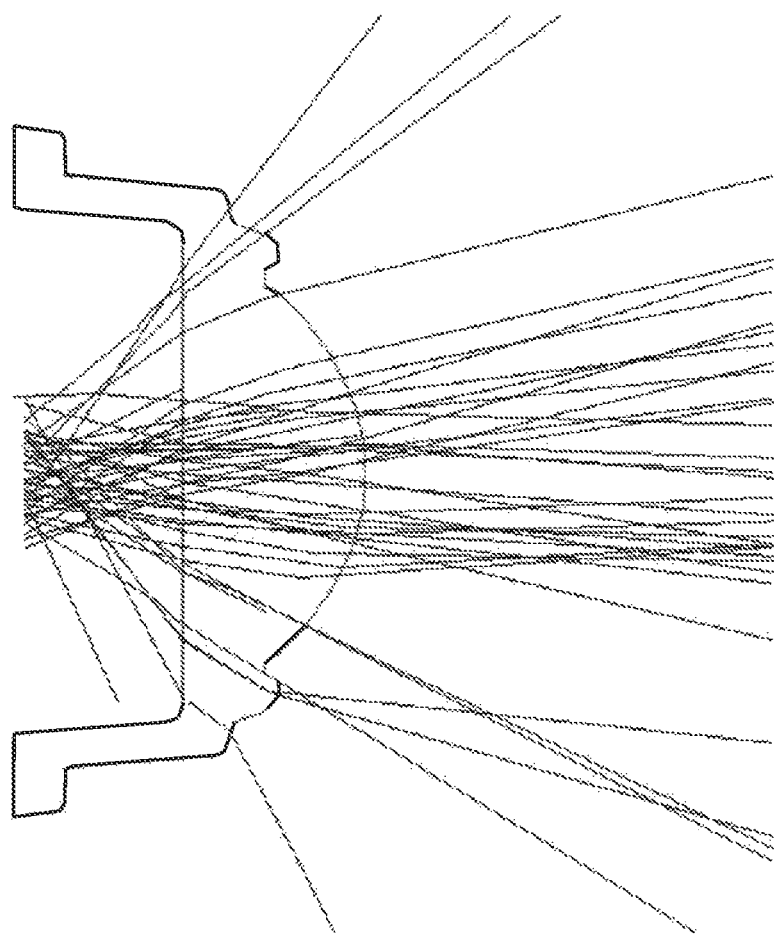
FIG. 5 shows a light path of the optical lens of the first embodiment according to the present invention.
Figure 6A:
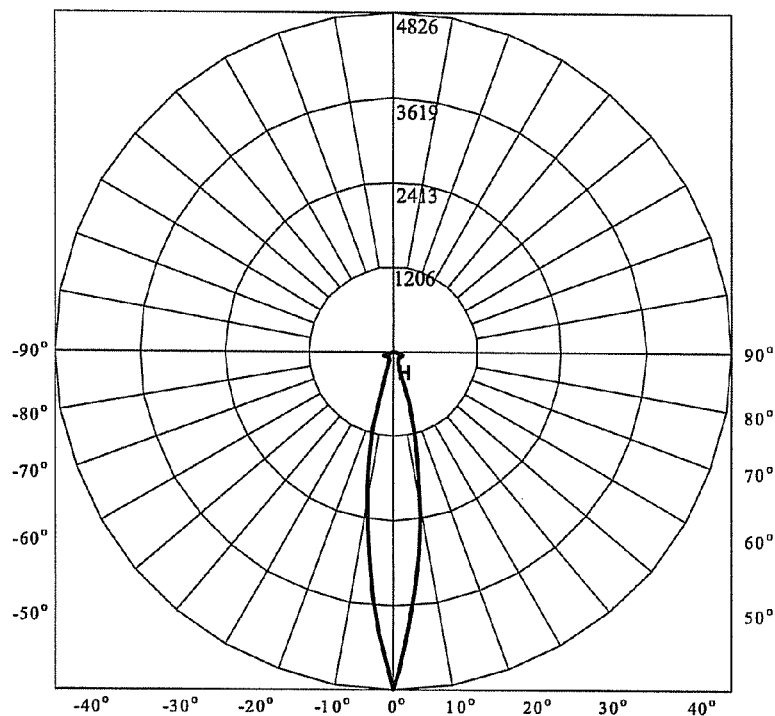
FIGS. 6A and 6B show the horizontal and vertical light intensity distribution of the optical of the first embodiment according to the present invention, respectively.
Figure 6B:
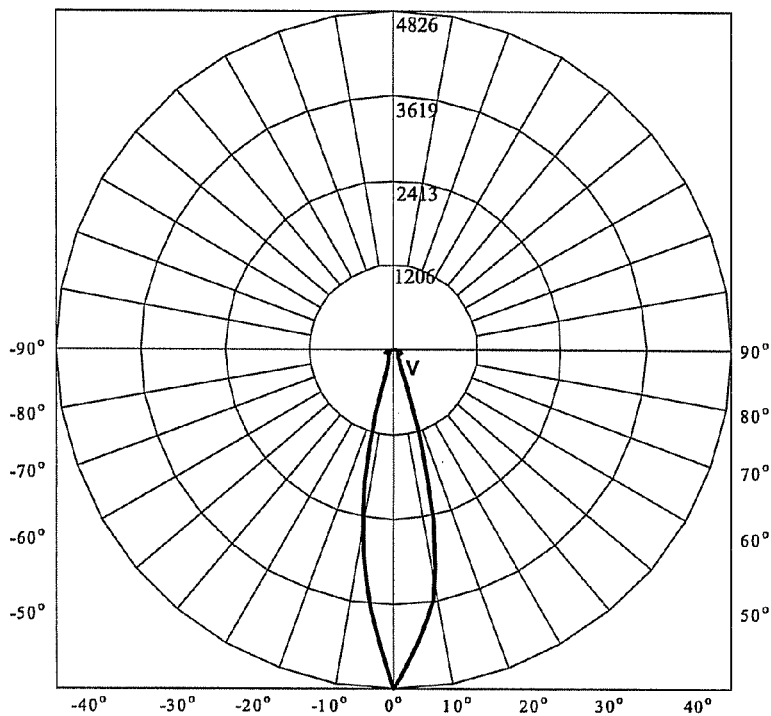
Figure 7:
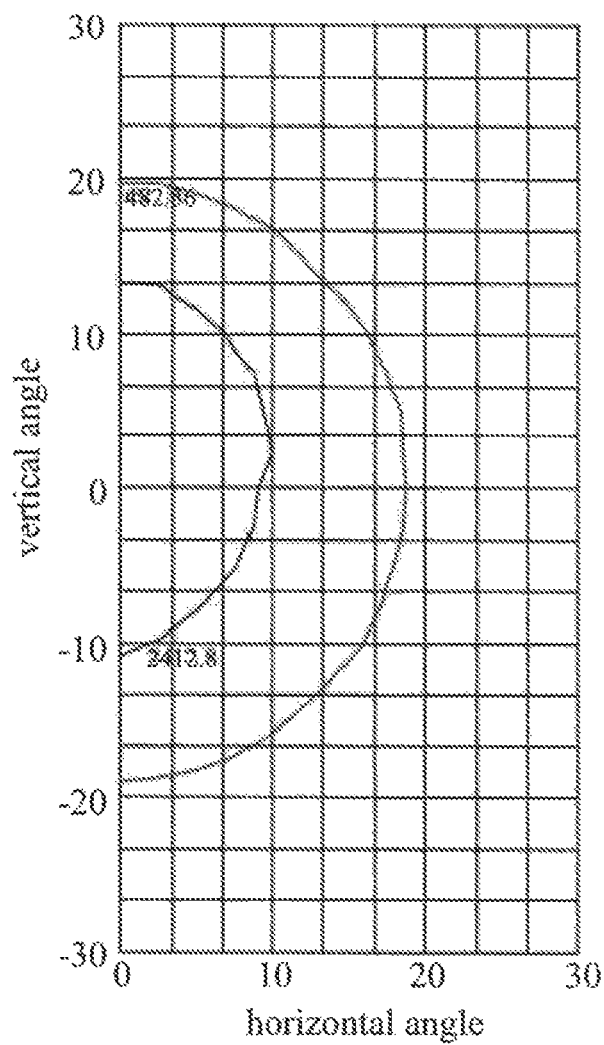
FIG. 7 shows another light intensity distribution of the optical of the first embodiment according to the present invention.
Figure 8:
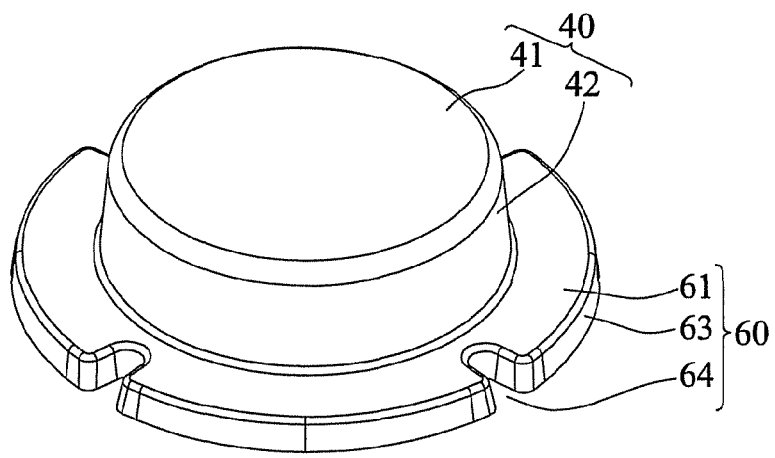
FIG. 8 is a perspective view of an optical lens of a second embodiment according to the present invention.
Figure 9:
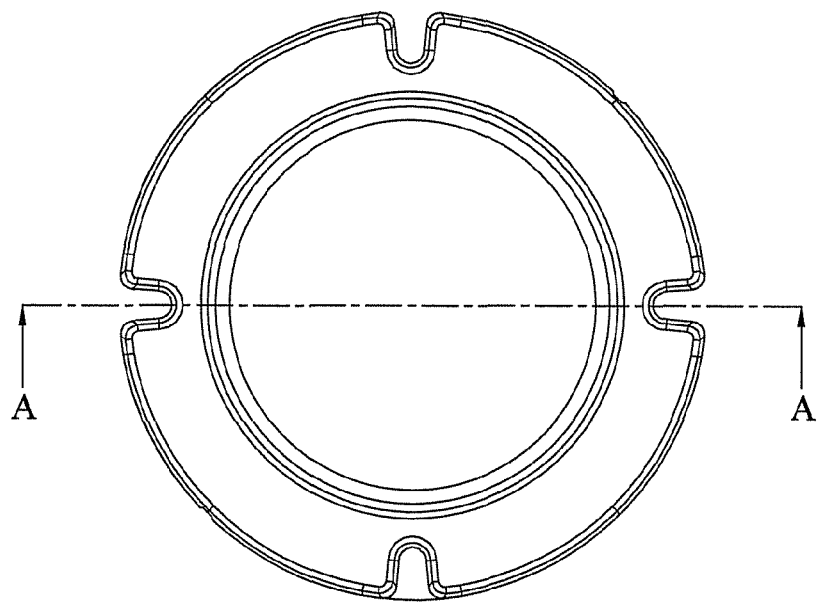
FIG. 9 is a top view of the optical lens of the second embodiment according to the present invention.

FIG. 5 shows a light path of the optical lens of the first embodiment according to the present invention. In an embodiment, the optical lens has a beam angle within 29-46 degrees. As shown in FIGS. 6A and 6B, when the distribution curve of luminous intensity of the optical lens is measured, the LED is disposed in the center shown in FIGS. 6A and 6B, and the light axis coincides with zero degree. It is known from FIGS. 6A and 6B that the optical lens has a maximum candela when the horizontal angle and the vertical angle are both zero, the light intensity is 4826 cd, and the farther the optical lens is offset from the light axis, the less the light intensity becomes. For example, the light intensity is about 2413 cd when the optical lens is offset from the light axis for 10 degrees, and is about 1206 cd when the optical lens is offset from the light axis for 15 degrees. FIG. 7 shows that the light distribution of the optical lens of the first embodiment is circular, axially symmetrical, and has a maximum candela that is equal to about 50%, i.e., 2412.8 cd, when the horizontal angle is about 10 degrees and the vertical angle is within about 10-15 degrees, or a maximum candela that is equal to about 10%, i.e., 482.56 cd, when the horizontal angle is about 20 degrees and the vertical angle is about 20 degrees Second Embodiment Referring FIGS. 8-11 a perspective view, a top view, a cross-sectional view and a bottom view of an optical lens of a second embodiment according to the present invention are shown, respectively. The optical lens comprises an output light region 40, an incident light region 50 and mounting portion 60.

The output light region 40 comprises an output light surface 41 disposed in a center of the output light region 40 and having a curvature R, and an outer surface 42 connected to and around the first output light surface 41. In an embodiment, the curvature R is 40.3 mm±2%.

The incident light region 50 comprises a planer incident light surface 51 opposing the output light surface 41, and an inner surface 52 opposing the outer surface 42 and around the incident light surface 41. The incident light surface 51 and the inner surface 52 connect to each other to constitute a slot 53 that is dented toward the output light surface 41 for receiving a light emitting unit (not shown) such as an LED.

The incident light surface 51 and the output light surface 41 constitute a plane-convex lens that has a focal length of 16 mm±2%. The incident light surface 51 is spaced from the output light surface 41 at a distance (i.e., the thickness of the plane-convex lens) t2 of 17.9 mm±2%. The slot 53 has a depth h2 greater than the focal length, and is 17.3 mm±2%, for the light emitting unit to be disposed on the focal point of the plane-convex lens. The slot 53 has a diameter that becomes smaller from an opening portion to the incident light surface 51, for example decreasing from 56 mm to 53.5 mm, for an LED that has a size within 10.5-25 mm to be received therein.

The mounting portion 60 is connected to the outer surface 42 and the inner surface 52, extends outside with respect to the incident light region 50 and the output light region 40, and comprises a plurality of mounting holes 64 and a plurality of wire slots 65. The mounting portion 60 includes opposing first surface 61 and second surface 62, and a lateral surface 63 connected to the first surface 61 and the second surface 62. The mounting holes 64 are formed on the lateral surface 63, for a screw to fix the optical lens to a fixture such as a lamp. The wire slots 65 are formed on the second surface 62, for a wire of a light emitting unit such as an LED to be received therein and protrudes therefrom.

Figure 10:
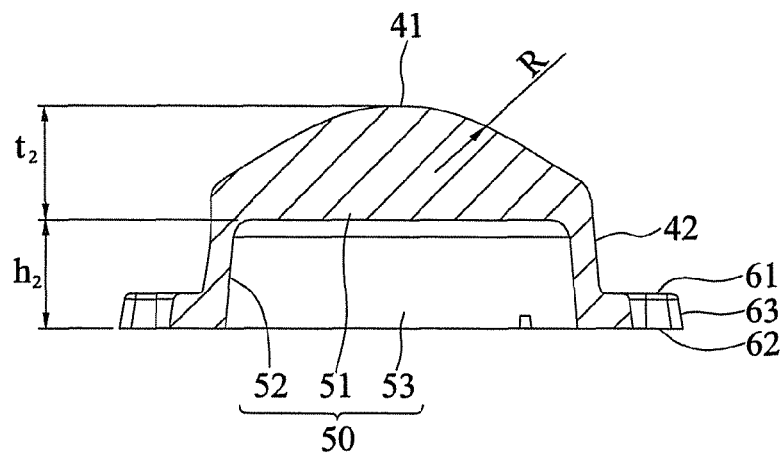
FIG. 10 is a cross-sectional view of optical lens of the second embodiment along a line A-A of FIG. 9 according to the present invention.
Figure 11:
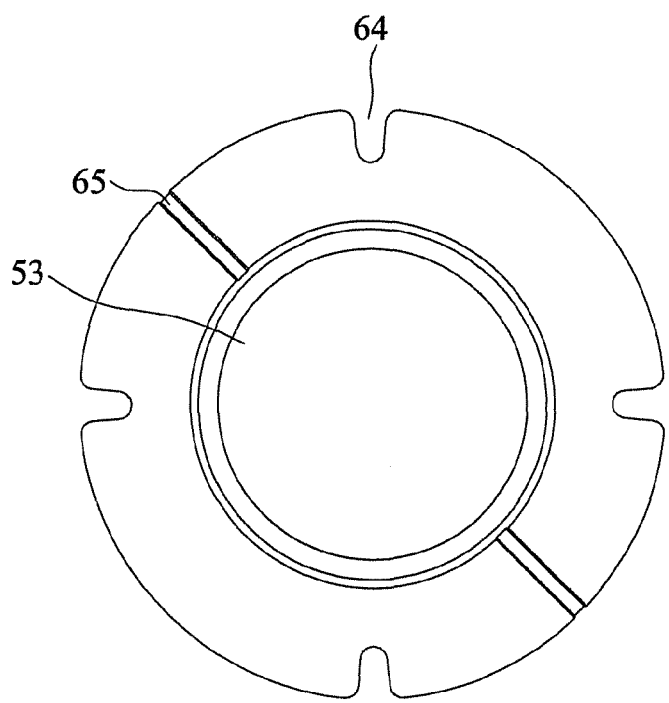
FIG. 11 is a bottom view of the optical lens of the second embodiment according to the present invention.

The cross-sectional view of FIG. 10 shows that the mounting portion 60 is greater than the plane-convex lens constituted by the output light surface 41 and the incident light surface 51. The bottom view of FIG. 11 shows that the optical lens according to the present invention is axially symmetrical, substantially circular, and a line connecting corresponding two of the four mounting holes 64 passes through a center, in order to ensure that the optical lens is securely fixed to another fixture. A line connecting the other two wire slots 65 also passes through the center.

Figure 12:
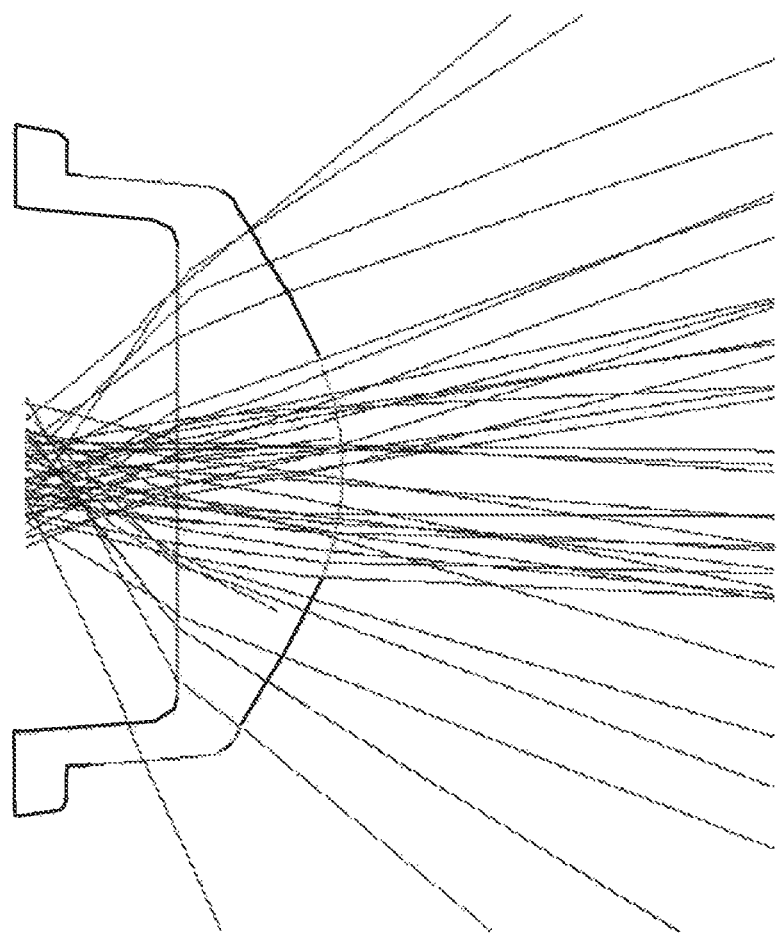
FIG. 12 shows a light path of the optical lens of the second embodiment according to the present invention.
Figure 13A:
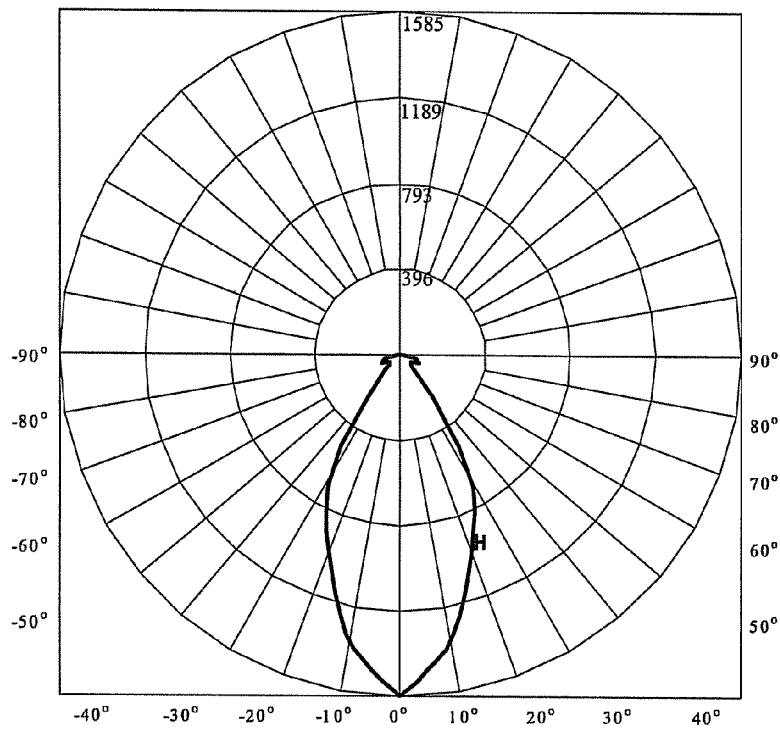
FIGS. 13A and 13B show the horizontal and vertical light intensity distribution of the optical of the second embodiment according to the present invention, respectively.
Figure 13B:
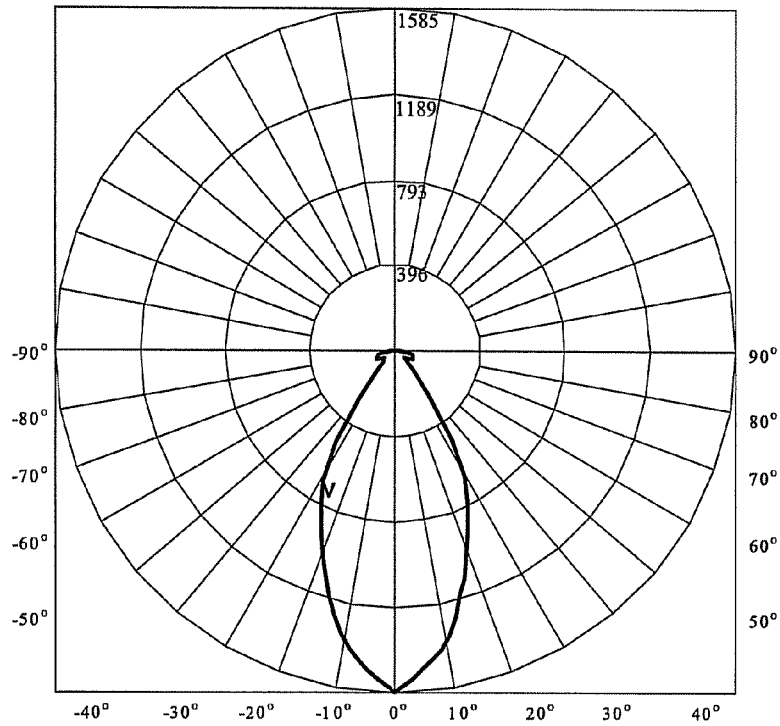
Figure 14:
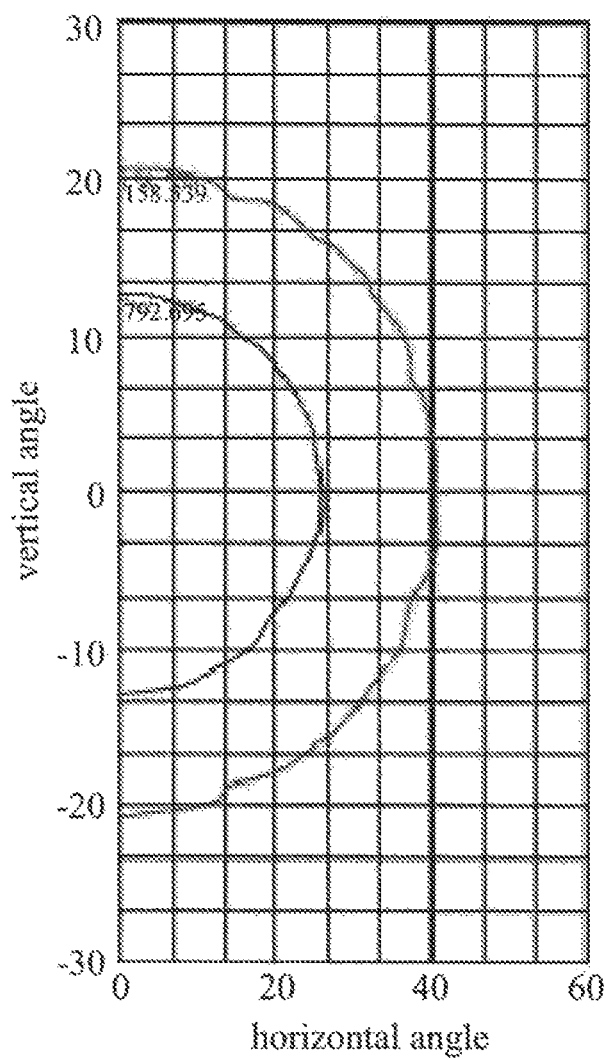
FIG. 14 shows another light intensity distribution of the optical of the second embodiment according to the present invention.

FIG. 12 shows a light path of the optical lens of the first embodiment according to the present invention. In an embodiment, the optical lens has a beam angle within 70-100 degrees. As shown in FIGS. 13A and 13B, when the distribution curve of luminous intensity of the optical lens is measured, the LED is disposed in the center shown in FIGS. 13A and 13B, and the light axis coincides with zero degree. It is known from FIGS. 13A and 13B that the optical lens has a maximum candela when the horizontal angle and the vertical angle are both zero, the light intensity is 1585 cd, and the farther the optical lens is offset from the light axis, the less the light intensity becomes. For example, the light intensity is about 1189 cd when the optical lens is offset from the light axis for 15 degrees, is about 793 cd when the optical lens is offset from the light axis for 25 degrees, and is about 396 cd when the optical lens is offset from the light axis for 35 degrees. FIG. 14 shows that the light distribution of the optical lens of the first embodiment is circular, axially symmetrical, and has a maximum candela that is equal to about 50%, i.e., 792.695 cd, when the horizontal angle is about 25 degrees and the vertical angle is within about 15 degrees, or a maximum candela that is equal to about 10%, i.e., 158.539 cd, when the horizontal angle is about 40 degrees and the vertical angle is about 20 degrees.

In sum, the present invention provides two symmetrical optical lenses, one having a beam angle within 29-46 degrees and a focal length of 16.86 mm±2%, the other having a beam angle within 70-100 degrees and a focal length of 16mm±2%. The optical lenses guide the light emitted by an LED that has a certain direction to travel in various directions evenly.

The foregoing descriptions of the detailed embodiments are only illustrated to disclose the features and functions of the present invention and not restrictive of the scope of the present invention. It should be understood to those in the art that all modifications and variations according to the spirit and principle in the disclosure of the present invention should fall within the scope of the appended claims.

What is claimed is:

1. An optical lens for covering a light emitting unit, the optical lens comprising:
    an output light region including a first output light surface at a center of the output light region and having a first curvature, a second output light surface around the first output light surface and having a second curvature greater than the first curvature, a buffer surface connecting the first output light surface and the second output light surface, and an outer surface connecting to and around the second output light surface;
    an incident light region including a planer incident light surface opposing the first output light surface and the second output light surface, and an inner surface around the planer incident light surface and opposing the outer surface, the planer incident light surface and the inner surface connected to each other and forming a slot denting toward the first output light surface, wherein the slot is configured to receive the light emitting unit; and
    a mounting portion around the output light region and the incident light region, the mounting portion connecting to the output light region and the incident light region and extending outside with respect to the output light region and the incident light region,
    wherein the mounting portion includes a first surface connecting to and around the outer surface, a second surface connecting to and around the inner surface, a lateral surface connecting the first surface and the second surface, a plurality of mounting holes formed on the lateral surface, and a plurality of wire slots formed on the second surface.

2. The optical lens of claim 1, having a beam angle within 29-46 degrees and a focal length of 16.86 mm±2%, wherein the slot has a depth greater than the focal length of the optical lens.

3. The optical lens of claim 1, wherein the first curvature is 24.8 mm±2%, the second curvature is 64.2 mm±2%, and the first output light surface is spaced apart from the planer incident light surface at a distance of 19.8 mm±2%.

4. The optical lens of claim 1, being made of glass.

5. An optical lens for covering a light emitting unit, the optical lens comprising:
    an output light region including an output light surface and an outer surface, the outer surface connecting to and around the output light surface;
    an incident light region including a planer incident light surface and an inner surface, the planer incident light surface opposing the output light surface, the inner surface around the planer incident light surface and opposing the outer surface, the planer incident light surface and the inner surface connected to each other and forming a slot denting toward the output light surface, wherein the slot is configured to receive the light emitting unit; and
    a mounting portion around the output light region and the incident light region, the mounting portion connecting to the output light region and the incident light region and extending outside with respect to the output light region and the incident light region,
    wherein the mounting portion includes a first surface connecting to and around the outer surface, a second surface connecting to and around the inner surface, a lateral surface connecting the first surface and the second surface, a plurality of mounting holes formed on the lateral surface, and a plurality of wire slots formed on the second surface.

6. The optical lens of claim 5, having a beam angle within 70-100 degrees and a focal length of 16 mm±2%, wherein the slot has a depth greater than the focal length of the optical lens.

7. The optical lens of claim 5, wherein the output light surface has a curvature of 40.3 mm +2%3 mm, and is spaced apart from the planer incident light surface at a distance of 17.9 mm±2%.

8. The optical lens of claim 5, being made of glass.

* * * * *